(12) United States Patent
Mazhar et al.

(10) Patent No.: US 10,454,763 B2
(45) Date of Patent: *Oct. 22, 2019

(54) APPLICATION DEPLOYMENT AND MANAGEMENT IN A CLOUD COMPUTING ENVIRONMENT

(71) Applicant: Kaavo, Inc., Austin, TX (US)

(72) Inventors: Jamal Mazhar, Austin, TX (US); Muhammad Shahzad Pervez, Boulder, CO (US)

(73) Assignee: Jamal Mazhar, Austin, TX (US)

( * ) Notice: Subject to any disclaimer, the term of this patent is extended or adjusted under 35 U.S.C. 154(b) by 6 days.

This patent is subject to a terminal disclaimer.

(21) Appl. No.: 15/815,442

(22) Filed: Nov. 16, 2017

(65) Prior Publication Data

US 2018/0077014 A1    Mar. 15, 2018

Related U.S. Application Data

(63) Continuation of application No. 14/719,112, filed on May 21, 2015, now Pat. No. 9,853,861, which is a continuation of application No. 13/572,537, filed on Aug. 10, 2012, now Pat. No. 9,043,751, which is a
(Continued)

(51) Int. Cl.
| | | |
|---|---|---|
| *H04L 12/24* | (2006.01) | |
| *H04L 29/08* | (2006.01) | |
| *H04L 12/911* | (2013.01) | |
| *G06F 9/455* | (2018.01) | |
| *G06F 9/50* | (2006.01) | |
| *H04L 12/26* | (2006.01) | |

(52) U.S. Cl.
CPC ........ *H04L 41/0806* (2013.01); *G06F 9/5088* (2013.01); *H04L 41/5054* (2013.01); *H04L 41/5064* (2013.01); *H04L 41/5077* (2013.01); *H04L 43/10* (2013.01); *H04L 47/70* (2013.01)

(58) Field of Classification Search
CPC ....... H04L 43/08; H04L 41/509; H04L 41/70; H04L 41/12; H04L 41/0813; H04L 47/70; H04L 67/10; H04L 67/1097; H04L 9/5072; H04L 9/45558; H04L 9/5088; H04L 41/0806; H04L 41/5064; H04L 41/5077
See application file for complete search history.

(56) References Cited

U.S. PATENT DOCUMENTS

| | | |
|---|---|---|
| 6,918,113 B2 | 7/2005 | Patel et al. |
| 7,080,378 B1 | 7/2006 | Noland et al. |
| 7,093,005 B2 | 8/2006 | Petterson |

(Continued)

FOREIGN PATENT DOCUMENTS

| | | |
|---|---|---|
| CN | 1687917 B1 | 10/2005 |
| CN | 101151593 B2 | 3/2008 |

OTHER PUBLICATIONS

Raghavan et al., Cloud control with distributed rate limiting, 12 pages (Year: 2007).*

(Continued)

*Primary Examiner* — Thuy Dao
(74) *Attorney, Agent, or Firm* — Ascenda Law Group, PC

(57) ABSTRACT

Methods, devices, and systems for management of a cloud computing environment for use by a software application. The cloud computing environment may be an N-tier environment. Multiple cloud providers may be used to provide the cloud computing environment.

18 Claims, 9 Drawing Sheets

Related U.S. Application Data continuation of application No. 12/247,654, filed on Oct. 8, 2008, now Pat. No. 8,271,974.

(56) References Cited

U.S. PATENT DOCUMENTS

| | | | |
|---|---|---|---|
| 7,350,186 | B2 | 3/2008 | Coleman et al. |
| 7,380,039 | B2 | 5/2008 | Miloushev et al. |
| 7,596,620 | B1 | 9/2009 | Colton et al. |
| 7,720,968 | B2 | 5/2010 | Clarke et al. |
| 7,822,594 | B2 | 10/2010 | Haviv et al. |
| 8,078,728 | B1* | 12/2011 | Pollan .............. G06F 9/5077 709/223 |
| 8,099,758 | B2 | 1/2012 | Schaefer et al. |
| 8,108,855 | B2 | 1/2012 | Dias et al. |
| 8,250,215 | B2* | 8/2012 | Stienhans .............. G06F 9/5072 709/223 |
| 8,271,974 | B2 | 9/2012 | Mazhar et al. |
| 8,402,110 | B2 | 3/2013 | Meijer et al. |
| 8,429,630 | B2 | 4/2013 | Nickolov et al. |
| 8,751,627 | B2* | 6/2014 | Liu .............. G06F 9/5088 709/224 |
| 8,863,125 | B2 | 10/2014 | Ciano et al. |
| 8,880,678 | B1 | 11/2014 | Colton et al. |
| 8,914,768 | B2 | 12/2014 | Karnik et al. |
| 8,918,488 | B2* | 12/2014 | Umbehocker ........ G06F 3/0604 709/221 |
| 9,037,692 | B2 | 5/2015 | Ferris |
| 9,043,751 | B2 | 5/2015 | Mazhar et al. |
| 9,086,928 | B2* | 7/2015 | Tung .............. G06F 9/5072 |
| 9,195,453 | B1 | 11/2015 | Giammaria et al. |
| 9,203,636 | B2 | 12/2015 | Stolorz et al. |
| 9,274,811 | B1 | 3/2016 | Reeves et al. |
| 9,413,687 | B2 | 8/2016 | Jackson |
| 9,473,577 | B2 | 10/2016 | Umbehocker |
| 9,578,063 | B1 | 2/2017 | Iyer et al. |
| 9,667,489 | B2 | 5/2017 | Morris et al. |
| 10,268,522 | B2* | 4/2019 | Ferris .............. G06F 9/5072 |
| 2002/0016166 | A1 | 2/2002 | Uchida et al. |
| 2002/0068554 | A1 | 6/2002 | Dusse |
| 2003/0065762 | A1 | 4/2003 | Stolorz et al. |
| 2003/0217131 | A1 | 11/2003 | Hodge et al. |
| 2004/0024979 | A1 | 2/2004 | Kaminsky et al. |
| 2004/0205691 | A1 | 10/2004 | Poole et al. |
| 2005/0102387 | A1* | 5/2005 | Herington .......... H04L 67/1008 709/223 |
| 2005/0155033 | A1 | 7/2005 | Luoffo et al. |
| 2005/0188075 | A1 | 8/2005 | Dias et al. |
| 2005/0198629 | A1 | 9/2005 | Vishwanath |
| 2006/0143350 | A1* | 6/2006 | Miloushev .......... G06F 9/5016 710/242 |
| 2006/0224741 | A1 | 10/2006 | Jackson |
| 2006/0230149 | A1 | 10/2006 | Jackson |
| 2006/0259949 | A1 | 11/2006 | Schaefer et al. |
| 2006/0277305 | A1 | 12/2006 | Bernardin et al. |
| 2007/0078960 | A1 | 4/2007 | Dawson et al. |
| 2007/0078988 | A1 | 4/2007 | Miloushev et al. |
| 2007/0177526 | A1 | 8/2007 | Siripunkaw et al. |
| 2007/0233698 | A1 | 10/2007 | Sundar et al. |
| 2007/0240160 | A1 | 10/2007 | Paterson-Jones et al. |
| 2007/0248106 | A1* | 10/2007 | Liu .............. H04L 47/15 370/401 |
| 2008/0080396 | A1 | 4/2008 | Meijer et al. |
| 2008/0082480 | A1 | 4/2008 | Gounares et al. |
| 2008/0082600 | A1 | 4/2008 | Meijer et al. |
| 2008/0123559 | A1 | 5/2008 | Haviv et al. |
| 2008/0147866 | A1 | 6/2008 | Stolorz et al. |
| 2008/0196025 | A1 | 8/2008 | Meijer et al. |
| 2008/0215450 | A1 | 9/2008 | Gates et al. |
| 2008/0235703 | A1 | 9/2008 | Crawford et al. |
| 2009/0049421 | A1 | 2/2009 | Meijer et al. |
| 2009/0064133 | A1 | 3/2009 | Suchy |
| 2009/0241104 | A1 | 9/2009 | Amiga et al. |
| 2009/0276771 | A1 | 11/2009 | Nickolov et al. |
| 2009/0300149 | A1 | 12/2009 | Ferris et al. |
| 2009/0300210 | A1* | 12/2009 | Ferris .............. G06F 9/5077 709/235 |
| 2009/0300635 | A1 | 12/2009 | Ferris |
| 2009/0319688 | A1 | 12/2009 | Mason et al. |
| 2010/0042670 | A1 | 2/2010 | Kamalakantha et al. |
| 2010/0042720 | A1 | 2/2010 | Steinhans et al. |
| 2010/0088205 | A1 | 4/2010 | Robertson |
| 2010/0131624 | A1 | 5/2010 | Ferris |
| 2010/0153482 | A1 | 6/2010 | Kim et al. |
| 2010/0192120 | A1 | 7/2010 | Raleigh |
| 2011/0137805 | A1 | 6/2011 | Brooksbanks et al. |
| 2012/0239739 | A1 | 9/2012 | Manglik et al. |
| 2014/0007079 | A1 | 1/2014 | Whitney et al. |
| 2014/0026122 | A1 | 1/2014 | Markande et al. |
| 2016/0378450 | A1 | 12/2016 | Fu et al. |

OTHER PUBLICATIONS

"An introduction to Elastic Computing: A New Software Design, Provisioning, and Pricing Model for Online Businesses and Enterprises", Elastra Corporation, http://elastra.com/wpcontent/uploads/elastra_ec_white-paper_ web.pdf, accessed Aug. 27, 2008.
"Cloud Computing Made Easy", Kaavo Inc., Power Point Presentation, presented Aug./Sep. 2008.
"Elastra Cloud Server Data Sheet", Elastra Corporation, http://elastra.com/wpcontent/uploads/2 00 8/11/ cloud_server datasheet. pdf, assessed Aug. 27, 2008.
3Tera, Inc., "AppLogic Release Notes," 12 pp. (Mar. 3, 2008).
3Tera, Inc., "AppLogic Runtime System," 2 pp. (Nov. 9, 2006).
3Tera, Inc., "AppLogic User Interface," 1 p. (Nov. 9, 2006).
3Tera, Inc., "AppLogic User Operations Manual," 6 pp. (Nov. 10, 2006).
3Tera, Inc., "The AppLogic Application Model," 13 pp. (2006).
3Tera, Inc., "What can you do with AppLogic," 2 pp. (Nov. 17, 2006).
Boss et al., "'Cloud Computing' IBM High Performance on Demand Solutions Research Paper", Oct. 2007, 1-17.
Dan Neel and Mario Apicella, "Taking VM to extremes," InfoWorld.com, Jun. 24/Jul. 1, 2002.
Donald Johnson, "Snapvantage: A Linux Cloning Tool," 20 pp. (Aug. 23, 2002).
Hu; et al., "Resource provisioning for cloud computing", Nov. 2009, 11 pages.
International Search Report issued in PCT Patent Application No. PCT/US2009/060020, dated May 24, 2010.
Jung et al., "A cost-sensitive adaption engine for sever consolidation of multi tier applications", Nov. 2009, 20 pages, <http://delivery.acm.org/10.1145/1660000/1656992/a9-jung.pdf>.
Kim et al., Power-aware provisioning of Cloud resources for real-time services, Nov. 2009, 6 pages.
Lim et al., "Automated control in cloud computing: challenges and opportunities", Jun. 2009, 6 pages, <http://delivery.acm.org/10.1145/1560000/1555275/p13-lim.pdf>.
Mache Creegar, CTO Roundtable: Cloud Computing, Jun. 2009, 18 pages, <http://delivery.acm.org/10.1145/1560000/1551646/p1-ctoroundtable.pdf>.
Meli & Grance, "The NIST Definition of Cloud (Draft)", NIST Special Publication 800-145, Jan. 2011, retrieved from <http://csrc.nist.gov/publications/drafts/800-145/Draft-SP-800-145_cloud-definition.pdf>.
Office Action and Search Report issued in Chinese Patent Application No. 200980145744.X, dated Nov. 27, 2012.
Rolia et al., Adaptive Information Technology for Service Lifecycle Management», HP Labs Technical Reports HPL 2008-80, Jul. 2008, 1-24.
Scott Ledbetter, "Virtual Disk Architecture and trhe S/390 Linux environment," 25 pp. (Aug. 20, 2002).
Search Report issued in European Patent Application No. 09819887.2 dated Nov. 12, 2012.
Storage Technology Corporation, "SnapVantage (A Linux Server Manager) Version 1 Installation, Customization and Usage Guide," Part No. 313494002, 2d Ed. Rev. B), 85 pp. (Oct. 2002).

(56) References Cited

OTHER PUBLICATIONS

Villela et al., Provisioning servers in the application tier fore-commerce systems, Feb. 2007, 23 pages.
Wang et al., "Scientific Cloud Computing: Early Definition and Experience", in 10th IEEE International Conference on High Performance Computing and Communications, Sep. 2008, 825-830.
*Kaavo Inc.* vs. *Cognizant Technology Solutions Corporations; et al.*, Report and Recommendation (filed Feb. 5, 2016), Case 1:14-cv-01192-LPS-CJB, 34 pgs.
*Kaavo Inc.* vs. *Cognizant Technology Solutions Corporations; et al.*, Memorandum Order (filed Mar. 31, 2016), Case 1:14-cv-01192-LPS-CJB, 7 pgs.
Report and Recommendation filed Nov. 3, 2016, *Kaavo Inc.* v. *Amazon.com Inc.; et al.*, Civil Action No. 15-638-LPS-CJB and 15-640-LPS-CJB, 31 pages.
Aslam; et al., "Provisioning within a WSAN cloud concept", SIGBED Review, Feb. 2013, 10(1):48-53.
Zhou et al., "A Declarative Optimization Engine for Resource Provisioning of Scientific Workflows in IaaS Clouds", Jun. 2015, 12 pages.
Grozev; et al., "Multi-Cloud Provisioning and Load Distribution for Three-Tier Applications", ACM Transactions on Autonomous and Adaptive Systems, Oct. 2014, vol. 9, No. 3, Article 13, 21 pages.
Amazon.com, Inc. and Amazon Web Services, Inc.'s Initial Invalidity Contentions dated Jun. 16, 2017, *Kaavo Inc.* v. *Amazon.com, Inc. and Amazon Web Services, Inc., C.A.* No. 15-638 (LPS) (CJB), 194 pages.
Bellavista; et al., "A Mobile Computing Middleware for Location and Context-Aware Internet Data Services", ACM Transactions on Internet Technology, Nov. 2006, 6(4):356-380.
Berman; et al., "The GrADS Project: Software Support for High-Level Grid Application Development", GRADS Project paper, Jul. 31, 2001, 22 pages.
Buyya; et al., "Market-Oriented Cloud Computing: Vision, Hype, and Reality for Delivering IT Services as Computing Utilities", Proceedings of the 10th IEEE International Conference on High Performance Computing and Communications (HPCC-08, IEEE CS Press, Los Alamitos, CA, USA), Sep. 25-27, 2008 (submitted on Aug. 26, 2008), 9 pages.
Kandukuri; et al., "Cloud Security Issues", 2009 IEEE International Conference on Services Computing, Sep. 21-25, 2009, Accession No. 10950024, pp. 517-520.
Nurmi; et al., "Eucalyptus : A Technical Report on an Elastic Utility Computing Architecture Linking Your Programs to Useful Systems", UCSB Computer Scient Technical Report No. 2008-10 (2008), 16 pages.
Qiao; et al., "Developing Event-condition-action Rules in Real-time Active Database", SAC '07 Proceedings of the 2007 ACM symposium on Applied computing, Mar. 11-15, 2007, pp. 511-516.
Meijer, E, "Democratizing the cloud", OOPSLA'07, Oct. 2007, 2 pages.

\* cited by examiner

APPLICATION DEPLOYMENT AND MANAGEMENT IN A CLOUD COMPUTING ENVIRONMENT

CROSS-REFERENCE(S) TO RELATED APPLICATION(S)

This is a CONTINUATION of U.S. application Ser. No. 14/719,112, filed May 21, 2015, which is a CONTINUATION of U.S. application Ser. No. 13/572,537, filed Aug. 10, 2012, now U.S. Pat. No. 9,043,751, issued May 26, 2015, which is a CONTINUATION of U.S. application Ser. No. 12/247,654, filed Oct. 8, 2008, now U.S. Pat. No. 8,271,974, issued Sep. 18, 2012, the entire contents of each of which are expressly incorporated by reference.

BACKGROUND

The present methods, devices, and systems relate generally to the fields of computers, information technology, virtualization, and cloud computing. More particularly, the present methods, devices, and systems relate to management of a cloud computing environment for use by a software application.

Virtualization technology facilitates the operation of multiple virtual servers within a single physical server system, such that each virtual sever may operate within its own unique system environment (e.g., operating system, applications). From a user's perspective, virtual servers may appear identical to a physical server. Users of the virtual server may be able to install any operating system, application, etc. on the virtual server without impacting users of other virtual servers operating within the same physical server system.

Cloud computing may be used to leverage virtualization of the resources of, for example, datacenters. Cloud providers, which may operate resources such as datacenters and/or other information technology-related capabilities, may facilitate the use of such resources by providing users (which may be remote to the cloud provider) with access to their resources. These potentially accessible resources may be collectively referred to as a "cloud computing environment" or a "cloud environment."

SUMMARY

Embodiments of the present methods for managing a cloud computing environment for use by a software application may include determining a requested initial cloud environment based on user-defined provisioning information, sending an initialization event based on the requested initial cloud environment, sending application data that is configured to cause the application to begin execution in the initial cloud environment configuration, receiving monitoring environment data that represents a current cloud environment state, determining a requested adjusted cloud environment based on the monitoring environment data, and sending a cloud environment adjustment event based on the requested adjusted cloud environment.

An "application" may include "application software," which may contain one or more units of functionality (e.g., a web portal with email functionality, database programs, word processing programs, accounting programs, inventory management programs, numerical analysis programs). An "application" may also include "services," which may contain one logical unit of functionality (e.g., an autonomous unit that is responsible for a transformation, storage and/or retrieval of data, such as a database management service or a database API service).

The requested initial cloud environment may be an N-tier computing environment. The initialization event may be configured to cause an initial cloud environment configuration to be made available to an application. The requested adjusted cloud environment may be an N-tier computing environment. The cloud environment adjustment event may be configured to cause an adjusted cloud environment configuration to be made available to the application.

In some embodiments, the application data may comprise computer-usable code defining the application to be executed in the initial cloud configuration. In some embodiments, the computer-usable code defining the application may not be present within the cloud environment prior to the sending of the application data. In some embodiments, the initial cloud configuration, the adjusted cloud configuration, and the computer-usable code defining the application are removed after execution of the application is complete. In some embodiments, the computer-usable code defining the application may be configured to be executed in a non-cloud computing environment (e.g., a physical computer environment), and may execute within the initial cloud configuration without being modified or optimized for use in a cloud computing environment.

In some embodiments, the initial cloud environment configuration may include an initial first cloud configuration that is made available by a first cloud provider. The requested adjusted cloud environment configuration may include a requested second cloud adjusted configuration. The adjusted cloud environment configuration may include an adjusted second cloud configuration. The cloud environment adjustment event may include a second cloud adjustment event based on the requested second cloud adjusted configuration. The second cloud adjustment event may be configured to cause the adjusted second cloud configuration to be made available by a second cloud provider.

In some embodiments, the requested initial cloud environment may include a requested first cloud initial configuration and a requested second cloud initial configuration. The initial cloud environment configuration may include an initial first cloud configuration and an initial second cloud configuration. The initialization event may include a first cloud initialization event based on the requested first cloud initial configuration and a second cloud initialization event based on the requested second cloud initial configuration. The first cloud initialization event may be configured to cause the initial first cloud configuration to be made available by a first cloud provider. The second cloud initialization event may be configured to cause the initial second cloud configuration to be made available by a second cloud provider.

In some embodiments, the requested adjusted cloud environment configuration may include a requested first cloud adjusted configuration and a requested second cloud adjusted configuration. The adjusted cloud environment configuration may include an adjusted first cloud configuration and an adjusted second cloud configuration. The cloud environment adjustment event may include a first cloud adjustment event based on the requested first cloud adjusted configuration, and a second cloud adjustment event based on the requested second cloud adjusted configuration. The first cloud adjustment event may be configured to cause the adjusted first cloud configuration to be made available by the first cloud provider. The second cloud adjustment event is configured to cause the adjusted second cloud configuration to be made available by the second cloud provider.

In some embodiments, the user-defined provisioning information may be determined using a needs analysis algorithm and/or a user input received from a user interface.

In some embodiments, the user-defined provisioning information may include geographic data. In some embodiments, the user-defined provisioning information may include service level agreement data.

Some embodiments of the present methods may also include forecasting an optimal cloud environment for future use with the application. In some embodiments, the forecasting the optimal cloud environment may be based on the monitoring environment data.

Some embodiments of the present methods may also include forecasting a future cost associated with executing the application. In some embodiments, the forecasting the future cost may be based on the monitoring environment data. In some embodiments, the forecasting the future cost may include using service level agreement data.

Some embodiments of the present methods may also include receiving security information, determining a requested security action based on the security information, and/or sending a security event based on the requested security action.

Embodiments of the present systems for managing a cloud computing environment for use by a software application may include a processor in communication with a memory. The memory may store processor-executable program code. Embodiments of the system may be configured to be operative in conjunction with the processor-executable program code to perform any of the present methods described above.

Embodiments of the present computer readable media may have computer usable program code executable to perform operations for managing a cloud computing environment for use by a software application. Some embodiments may have computer usable program code executable to perform any of the present methods described above.

Embodiments of the present first computer readable media may have first computer usable program code that may be executable to install second computer usable program code on a second computer readable medium, where the second computer usable program code is executable to perform operations for managing a cloud computing environment for use by a software application. In some embodiments, the second computer usable program code may be executable to perform any of the present methods described above.

Any embodiment of any of the present methods, devices (e.g., computer readable media), and systems may consist of or consist essentially of—rather than comprise/include/contain/have—the described functions, steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

The term "send" and its variations are defined as including transmitting, both directly and indirectly (e.g., passing through intermediate components), and sending, both directly and indirectly. Similarly, the term "communicate" and its variation are defined as including both direct communication and indirect communication.

The term "server" includes virtual servers and physical servers. The term "computer system" includes virtual computer systems and physical computer systems.

The terminology "based on" denotes a relationship or dependency, but is not limited to situations where the relationship or dependency is exclusive. For example, "X is based on Y" is not limited to a relationship where X is equal to Y or where X is equal to a constant time Y. Instead, the determination of X is dependant on Y, but there may be other variables involved in the determination of X.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. Thus, a method comprising certain steps is a method that includes at least the recited steps, but is not limited to only possessing the recited steps. Likewise, a device or system comprising certain elements includes at least the recited elements, but is not limited to only possessing the recited elements.

Similarly, a computer readable medium "comprising" computer usable program code for performing certain steps is a computer readable medium that has computer usable instructions for implementing at least the recited steps, but also covers media having computer usable instructions for implementing additional, unrecited steps. Further, a computer system that is configured to perform at least certain functions is not limited to performing only the recited functions, and may be configured in a way or ways that are not specified provided the system is configured to perform the recited functions.

The terms "a" and "an" are defined as one or more than one, unless this application expressly requires otherwise. The term "another" is defined as at least a second or more.

BRIEF DESCRIPTION OF THE DRAWINGS

The following drawings illustrate by way of example and not limitation. Identical reference numerals do not necessarily indicate an identical structure, system, or display. Rather, the same reference numeral may be used to indicate a similar feature or a feature with similar functionality. Every feature of each embodiment is not always labeled in every figure in which that embodiment appears, in order to keep the figures clear.

DESCRIPTION OF ILLUSTRATIVE EMBODIMENTS

In one aspect, the present disclosure provides embodiments that are methods for managing a cloud computing environment for use by a software application. In another aspect, the present disclosure provides embodiments that are systems for managing a cloud computing environment for use by a software application. Another aspect of the present disclosure provides computer readable media having computer usable program code executable to perform operations for managing a cloud computing environment for use by a software application. Yet another aspect of the present disclosure provides first computer readable media having first computer usable program code that is executable to install second computer usable program code on a second computer readable medium, where the second computer usable program code is executable to perform operations for managing a cloud computing environment for use by a software application.

Figure 1:
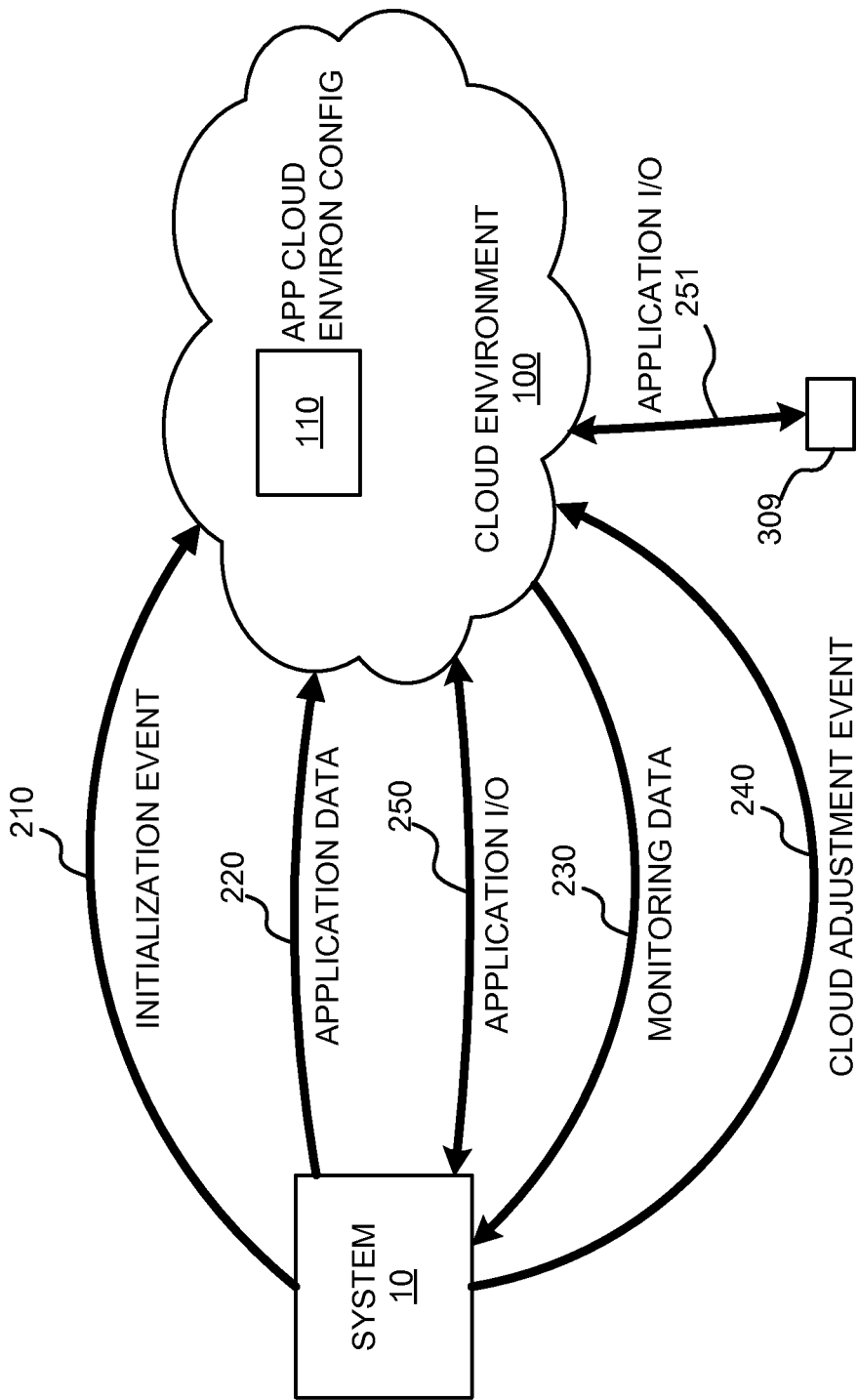
FIG. 1 is a schematic diagram depicting one embodiment of the present systems managing a cloud environment.

An embodiment of a present method for managing a cloud computing environment for use by a software application is depicted in FIG. 1. In this embodiment, system 10 is configured to perform one method of managing cloud environment 100. System 10 may be remote from cloud environment 100. System 10 may send cloud environment initialization event 210 to cloud environment 100 to cause application cloud environment configuration 110 to be made available to for use by an application (e.g., as an environment for running the application). As used in this disclosure, the term "application" includes both "application software," which may contain one or more units of functionality (e.g., a web portal with email functionality, database programs, word processing programs, accounting programs, inventory management programs, numerical analysis programs), and "services," which may contain one logical unit of functionality (e.g., an autonomous unit that is responsible for a transformation, storage and/or retrieval of data, such as a database management service or a database API service).

Application cloud environment configuration 110 may include an N-tier computing environment that is made available to the application by cloud environment 100, and may be dependant on information included in cloud environment initialization event 210. Cloud environment initialization event 210 may cause application cloud environment configuration 110 that includes an environment having any number of tiers (e.g., logical groupings of components directed to a general type of functionality) to be made available. For example, cloud environment initialization event 210 may be configured to cause the availability of application cloud environment configuration 110 that may include an environment that contains a presentation tier, an application tier (e.g., a logic or business logic tier), and a database tier. Other configurations of cloud environment initialization event 210 may cause the availability of application cloud environment configuration 110 that may include an environment containing 1, 2, 3, 4, 5, 6, 7, 8, 9, 10, 11, 12, 13, 14, 15, 16, 17, 18, 19, 20 or more tiers.

In some embodiments, the sending of cloud environment initialization event 210 to cloud environment 100 may comprise the passing of one or more software objects that contain information related to the provisioning of the resources by cloud environment 100 for application cloud environment configuration 110 (e.g., number of servers to launch in each tier of the N-tiers, configurations of firewalls for security, middleware requirement data, required dependent application data). In some embodiments, the sending of cloud environment initialization event 210 to cloud environment 100 may comprise an application programming interface (API) call, or a set of multiple API calls.

Figure 2A:
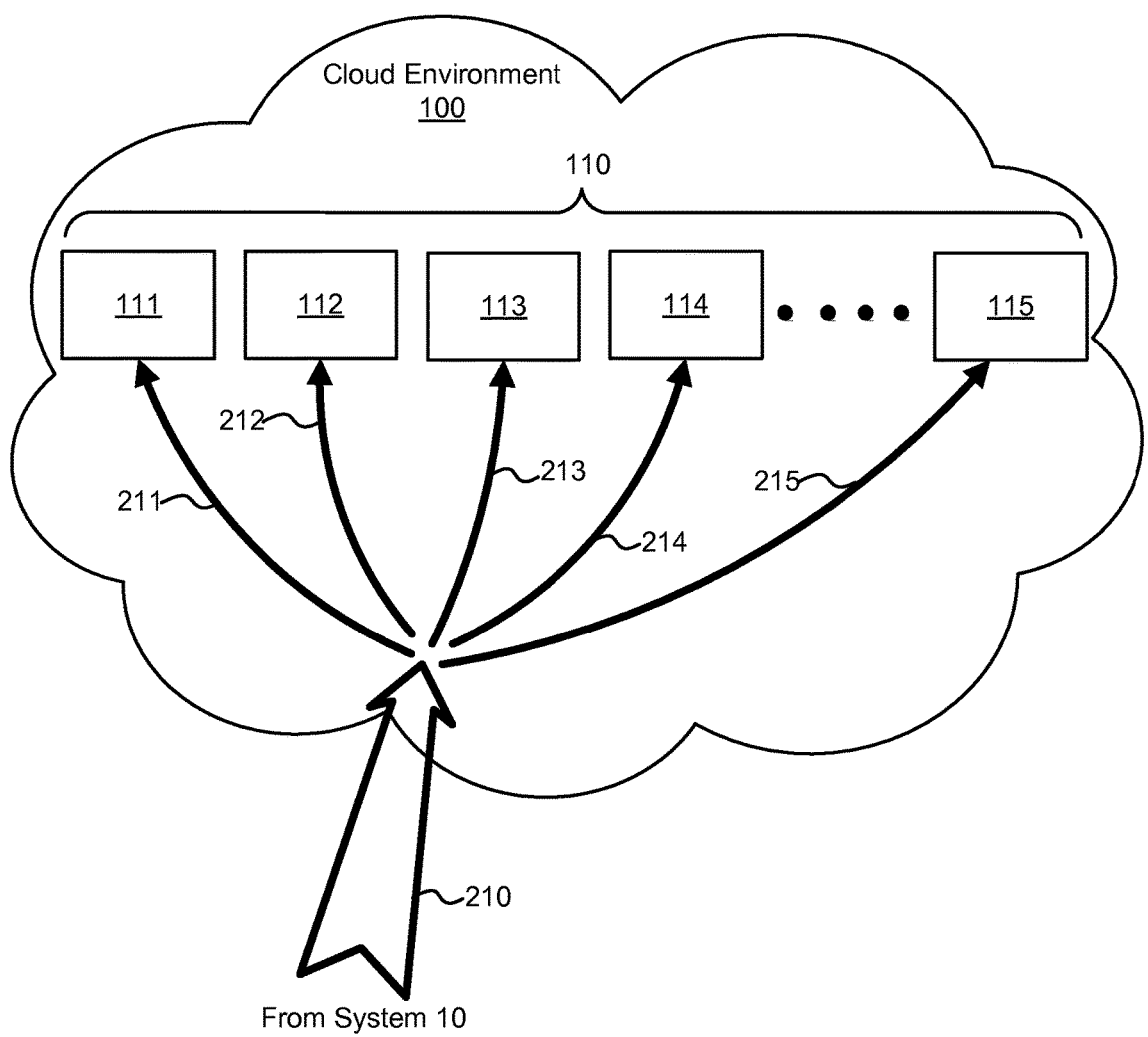
FIGS. 2A-2C are schematic diagrams depicting aspects of the management of the cloud environment performed by embodiments of the present disclosure.

Cloud environment 100 may contain one cloud configuration, or several cloud configurations that collectively provide application cloud environment configuration 110. Referring to FIG. 2A, the depicted embodiment contains M cloud configurations (111-115) that collectively provide application cloud environment configuration 110. The M cloud configurations may be provided by M unique cloud providers (e.g., each individual cloud configuration may be provided by a different entity). Alternately, the M cloud configurations may be provided by less than M unique cloud providers, with one or more cloud provider supplying more than one of the M cloud configurations. Each individual cloud configurations may be a "private" cloud (e.g., the operator of may be a related entity to the cloud provider, and access to the cloud provider may not be generally accessible to outside entities) or a "public" cloud (e.g., the cloud provider may be generally accessible to some outside entities). Each cloud provider may be remote from the other cloud providers, and from system 10.

Each individual cloud configuration may contribute all, a portion, or none of each individual tier of the N-tier configuration of application cloud environment configuration 110. For example, an embodiment of application cloud environment configuration 110 may include an application tier that contains servers (e.g., virtual servers, physical servers) from cloud configurations 111 and 112, and a database tier that contains servers from cloud configurations 112-115. In another exemplary embodiment, all N tiers of application cloud environment configuration 110 may contain servers from each of the M cloud configurations.

Embodiments of the present disclosure may also include cloud environment initialization event 210 sent to cloud environment 100 by system 10. In the embodiment depicted in FIGS. 1 and 2A, cloud environment initialization event 210 is sent directly from system 10 to cloud environment 100. In other embodiments, cloud environment initialization event 210 may be sent to cloud environment 100 from system 10 indirectly, passing through additional components that may be interposed in a communications path between system 10 and cloud environment 100. In some embodiments, the interposed additional components may modify cloud environment initialization event 210 before it reaches cloud environment 100. For example, interposed additional components may modify cloud environment initialization event 210 by adjusting formatting or adding timestamp information.

Cloud environment initialization event 210 may be configured based on a requested initial cloud environment, which in turn may be determined based on user-defined provisioning information. The requested initial cloud environment may represent a cloud environment configuration suitable for the user-defined provisioning information. Cloud environment initialization event 210 may be configured to cause such a cloud environment to be made available. In some embodiments of the present disclosure, the user-defined provisioning information may be determined using user input received from a user interface. In some embodiments, user input can be provided by another computer system. Examples of information that may comprise the user-defined provisioning information include geographic preference (e.g., geographic restriction of locations for data and/or applications), service level requirements (e.g., availability), pricing information, tier definitions (e.g., number of tiers, computational resources needed for each tier, security needs for each tier), security requirements (e.g., data encryption requirements), audit/backup requirements (e.g., frequency of backup, data retention specifications), and special monitoring/alert requests (e.g., alert when a firewall rule is breached, alert when average CPU utilization reaches or exceeds a threshold value for a given time in a given tier).

In some embodiments, a configuration input file may comprise all or a portion of the user-defined provisioning information. The configuration input file data may be stored in memory, or may be stored on another storage medium. The configuration input file may facilitate modularity and the sharing of information between modules. In some embodiments, a needs analysis algorithm may be applied to the user input to generate a configuration input file.

In some embodiments, the configuration input file may be in the format of an industry-standard software language. An example of a configuration input file written in XML (Extensible Markup Language) is presented in the Appendix appearing at the end of the present disclosure.

In some embodiments of the present disclosure that generate a configuration input file based on user input received from a user interface, the configuration input file may be copied and stored for reuse. Subsequent identical configurations of cloud environment initialization event 210 may be configured by utilizing the stored configuration input file, thereby eliminating the need to collect user input from a user interface for repeated identical configurations of cloud environment initialization event 210. In some embodiments, the stored configuration input files may be modified. In some embodiments, the configuration input files may be generated without the use of a user interface (e.g., a configuration input file may be written by a user in an industry-standard language).

Cloud environment initialization event 210 may be configured to cause application cloud environment configuration 110 to be made available for executing an application. The N-tier configuration of application cloud environment configuration 110 may be made available based on the configuration of cloud environment initialization event 210. FIG. 2A depicts an embodiment in which cloud environment initialization event 210 includes M cloud initialization events (211-215) which are configured to cause M cloud configurations (111-115) that collectively provide application cloud environment configuration 110.

Cloud environment initialization event 210 may be configured to optimize the configuration of application cloud environment configuration 110 based on criteria such as, for example, geographic preferences and dependencies, service level agreement (SLA) data, cloud provider preference, and collected cloud provider performance data (e.g., quality of service data). Service level agreement data may include, for example, a user's desired service level (e.g., geographic redundancy, system availability) and the service level required for each cloud provider (e.g., monitored cloud provider performance compared to cloud provider specifications).

Referring again to the embodiment depicted in FIG. 1, system 10 may be configured to send application data 220 to cloud environment 100 to cause an application to begin execution within application cloud environment configuration 110. Application data 220 may include, for example, specification/configuration data for the application, or the computer-usable code of the application. In some embodiments, application data 220 may include substantially the entire computer-usable code of the application (e.g., the entirety of the computer-usable application code for executing a web application, database application, numerical analysis application, or email service). In some of these embodiments, the computer-usable code defining the application may not be present within cloud environment 100 or application cloud environment configuration 110 prior to the sending of application data 220 to cloud environment 100 by system 10.

In some embodiments, the computer usable code defining the application may not be present within cloud environment 100 after completion of the lifecycle of the application. For example cloud environment 100 may initially not contain computer-usable code defining the application, which may subsequently be sent as part (or all) of application data 220 to cloud environment 100 to facilitate execution of the application within application cloud environment configuration 110. After execution of the application is completed, the resources of application cloud environment configuration 110 may be returned to cloud environment 100, and the computer-usable code defining the application may be removed from cloud environment 100 (e.g., after the lifecycle of the application is complete, the virtual environment provided by application cloud environment configuration 110 and the instance of the computer-usable code defining the application that was sent as part of application data 220 are removed).

In some embodiments, the computer-usable code defining the application (that may be sent as part or all of application data 220), may be configured to be executed in a non-cloud computing environment. In these embodiments, the computer-usable code may execute within application cloud environment configuration 110 without being modified or optimized for use in a cloud computing environment. In other words, some embodiment allow the customization of application cloud environment configuration 110 to match the required environment for an existing configuration of an application. Therefore the reconfiguring of the application or the use of additional middleware to accommodate the use of the application within application cloud environment configuration 110 may not be required.

For example, system 10 and application cloud environment configuration 110 may be configured to execute a version of an application that was previously configured and/or optimized for execution in a user's existing conventional physical computer environment. System 10 may facilitate the use of such an application by causing application cloud environment configuration 110 to be provided that substantially matches the user's existing conventional physical computer environment for which the application was configured and/or optimized.

The communication of the application's input and output data of some embodiments of the present disclosure is depicted by application input/output 250 and application input/output 251. In some embodiments, application input/output 250 may be communicated between the application executing within application cloud environment configuration 110 and system 10. In some embodiments, application input/output 251 may be communicated between the application executing within application cloud environment configuration 110 and application end user 309 that is not a user of system 10.

Continuing with the embodiment of FIG. 1, system 10 may configured for receiving monitoring data 230 from cloud environment 100. Monitoring data 230 may include, for example, data relating to CPU utilization, memory utilization, I/O utilization, and other performance-related criteria of application cloud environment configuration 110, cloud availability data for each individual cloud provider within cloud environment 100, and network availability/performance. Monitoring data 230 may also include security information received from cloud environment 100 (e.g., messages from a firewall scanner/monitor).

Some embodiments of the present disclosure may include predictive forecasting of an optimal cloud environment for future execution of the application based on monitoring data 230. Predictive forecasting of an optimal cloud environment may be performed using techniques such as, for example, neural networks, time-series algorithms, and regression analysis to predict resources needed in future time forecast periods (e.g., the next 10 minutes, hour, day, week, month, next quarter, year). The forecasting algorithms employed may be refined and updated as additional data becomes available.

In some embodiments, predictive forecasting of a future cost associated with executing the application may be performed based on monitoring data 230. For example, information from predictive forecasting of an optimal cloud environment and current pricing/billing information may be used to predict future costs associated with executing the application for various time periods (e.g., the forecasted bill at the end of the next month).

Figure 2B:
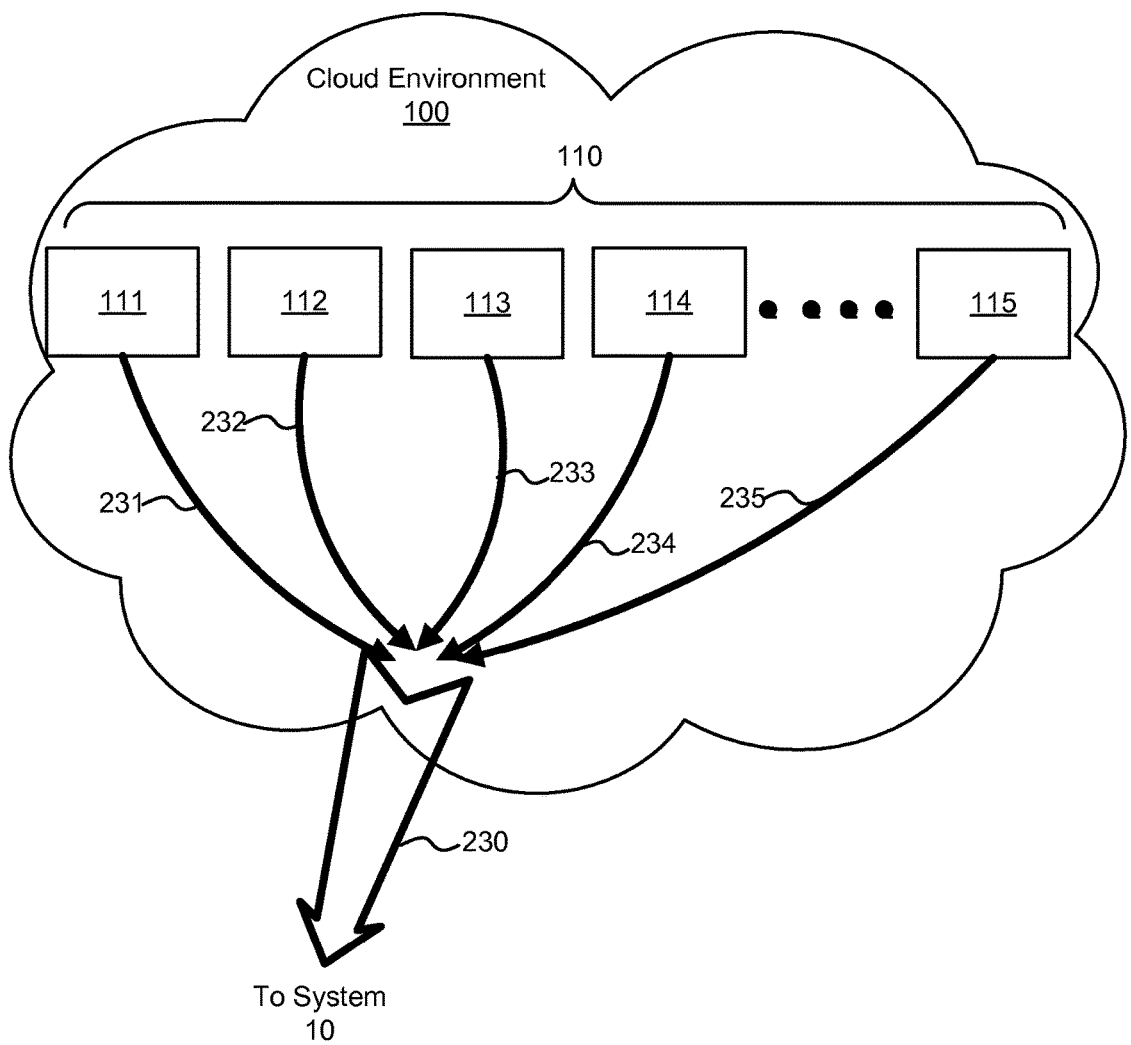

FIG. 2B depicts an embodiment having monitoring data 230 that comprises a plurality of cloud environment configuration monitoring data (231-235), respectively corresponding to each of M cloud configurations (111-115) that collectively provide application cloud environment configuration 110. In such an embodiment, the cloud environment configuration monitoring data 231-235 may be received either synchronously or asynchronously.

Referring again to the embodiment of FIG. 1, system 10 may be configured for sending cloud environment adjustment event 240 to cloud environment 100 to cause adjustment of application cloud environment configuration 110 that is available to for use by the application (e.g., adjust the environment for running the application by increasing, decreasing, or changing resources). In some embodiments, the sending of cloud environment adjustment event 240 to cloud environment 100 may comprise the passing of one or more software objects that contain information related to the provisioning of the resources by cloud environment 100 for application cloud environment configuration 110 (e.g., number of servers to launch in each tier of the N-tiers, configurations of firewalls for security, middleware requirement data, required dependent application data). In some embodiments, the sending of cloud environment initialization event 240 to cloud environment 100 may comprise an API call, or a set of multiple API calls.

Figure 2C:
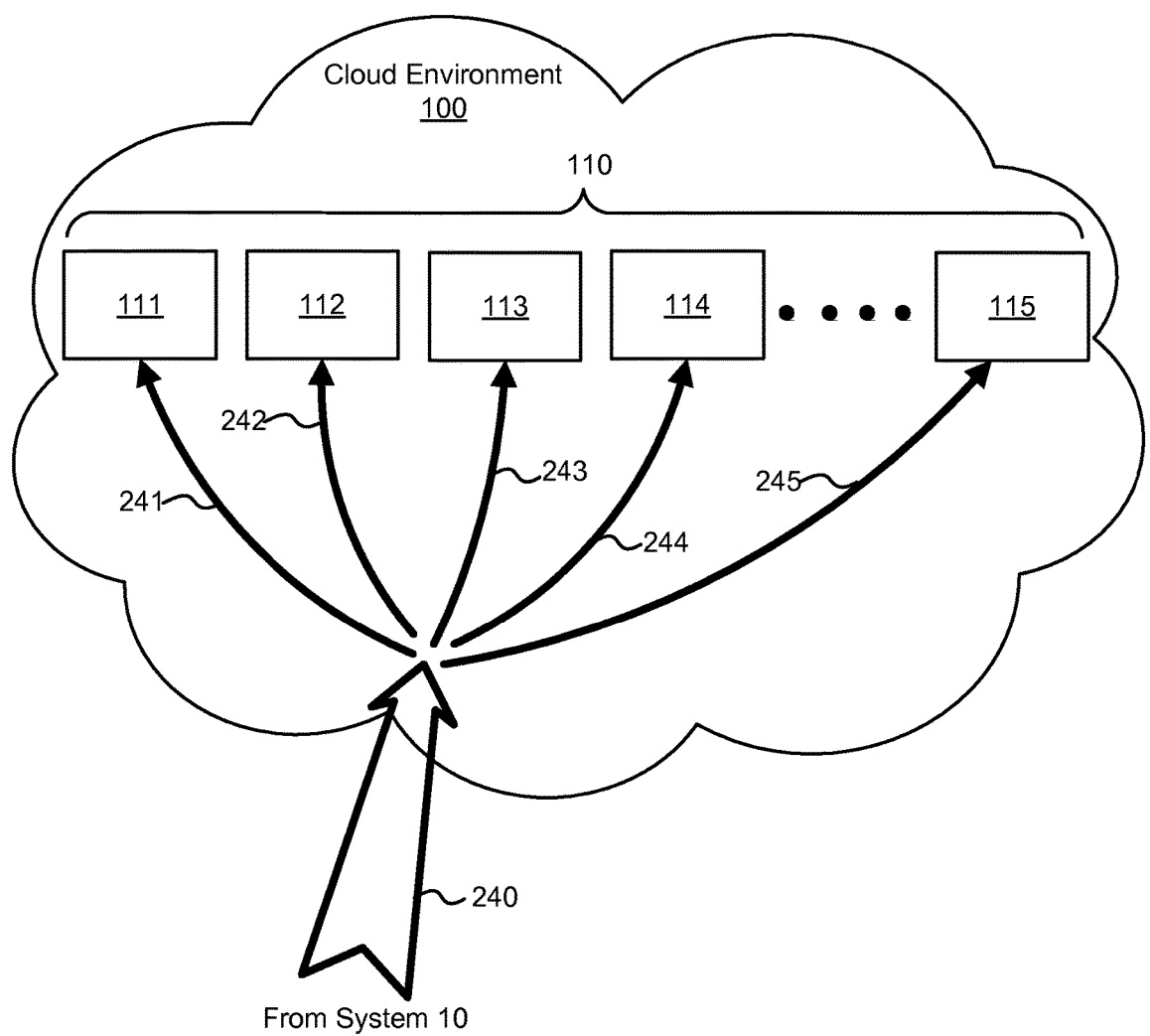

Referring also to FIG. 2C, the adjustment of application cloud environment configuration 110 may include adjusting the number of cloud configurations (111-115) and/or cloud providers of the N-tier computing environment that collectively provide application cloud environment configuration 110. The adjustment of application cloud environment configuration 110 may be dependant on information included in cloud environment adjustment event 240. In the depicted embodiment, cloud environment adjustment event 240 includes M cloud adjustment events (241-245) which may be configured to adjust the M cloud configurations (111-115) that collectively provide application cloud environment configuration 110. Cloud configurations may be reconfigured, added, subtracted, and/or replaced by other cloud configurations. Similarly, cloud providers may be added, subtracted, and/or replaced by other cloud providers. An added cloud configurations may be a private cloud or a public cloud. Embodiments of the present disclosure may send cloud environment adjustment event 240 to cloud environment 100 synchronously or asynchronously. Cloud environment adjustment event 240 may be sent many times over the lifecycle of the execution of an application. The adjustment of application cloud environment configuration 110 caused by cloud environment adjustment event 240, as well as the adjustment of the M cloud configurations (111-115) may be synchronous or asynchronous.

In the embodiment depicted in FIGS. 1 and 2C, cloud environment adjustment event 240 is sent directly from system 10 to cloud environment 100. In other embodiments, cloud environment adjustment event 240 may be sent to cloud environment 100 from system 10 indirectly, passing through additional components that may be interposed in a communications path between system 10 and cloud environment 100. In some embodiments, the interposed additional components may modify cloud environment adjustment event 240 before it reaches cloud environment 100. For example, interposed additional components may modify cloud environment adjustment event 240 by adjusting formatting or adding timestamp information.

Cloud environment adjustment event 240 may be configured based on a requested adjusted cloud environment, which in turn may be determined based on monitoring data 230. In some embodiments of the present disclosure, the requested adjusted cloud environment may be determined using monitoring data 230 to optimize the configuration of application cloud environment configuration 110 based on criteria such as, for example, geographic preferences and dependencies, SLA data, cloud provider preference, and collected cloud provider performance data (e.g., quality of service data). For example, if monitoring data 230 indicates that one cloud provider is not meeting required service levels (e.g., SLA-defined criteria), a requested adjusted cloud environment may be determined that represents a cloud environment that addresses the deficiency by replacing the deficient cloud provider with a different cloud provider. Based on the requested adjusted cloud environment, cloud environment adjustment event 240 may be configured to cause an adjustment of application cloud environment configuration 110 that replaces a cloud configuration provided by the deficient cloud provider with a newly instantiated cloud configuration from the different cloud provider.

Figure 3:
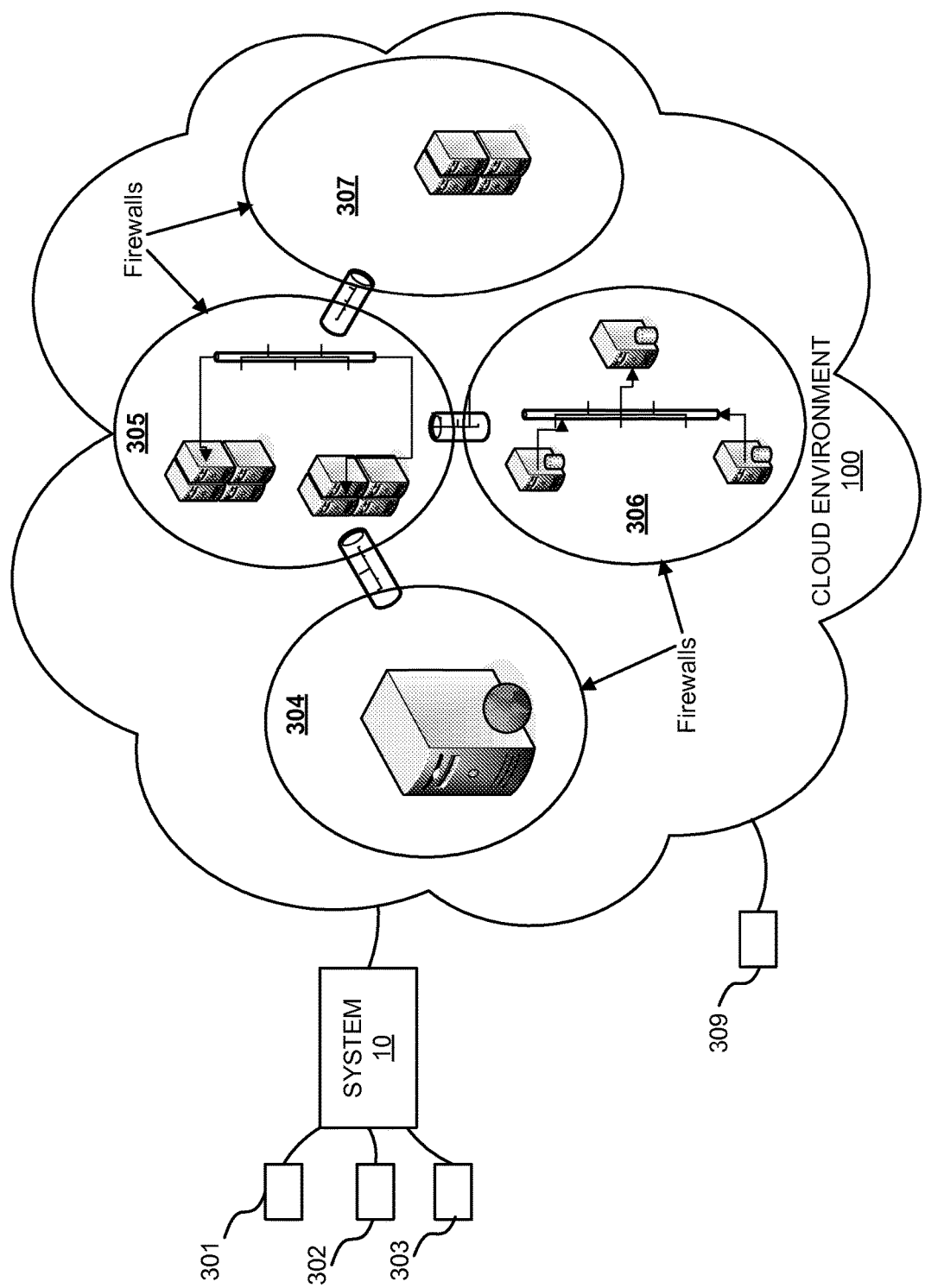
FIG. 3 is a schematic diagram depicting one possible configuration containing an embodiment of the present systems, end users of the present system, end users of the application executing in the cloud environment, various individual tiers configured within the cloud environment, and individual firewalls configured for the individual tiers.

FIG. 3 depicts an embodiment of the present disclosure having end users 301-303 connected to system 10, which is configured to perform one method of managing cloud environment 100. System 10 may be remote from cloud environment 100. In this embodiment, end users 301-303 are end users of system 10 (e.g., users that manage cloud environment 100 for use by a software application), and may be remote from system 10 and from cloud environment 100. The end users of the application executed in the cloud computing environment may be unique from end users 301-303 of system 10, or they may be common. For example, application end user 309 may be an end user of a web application executing in cloud environment 100. End users 301-303 may be end users of system 10, overseeing the management of the cloud computing environment used by the web application, but not be end users of the web application executing in cloud environment 100.

In the embodiment of FIG. 3, cloud environment 100 includes a cloud environment configuration that comprises tiers 304-306 and monitoring module 307. Tier 304 includes High Availability Load Balancers running in two different datacenters (two different cloud configurations). Tier 305 includes a JBoss Application Server Cluster running in two different datacenters (two different cloud configurations). Tier 306 includes an MySQL Database Cluster running in two different datacenters (two different cloud configurations). Monitoring module 307 may be located in one of the cloud configurations utilized by tiers 304-306, or it may be located separately. The depicted embodiment includes tier-specific firewalls providing customized security for each tier, and for the monitoring module.

Figure 4:
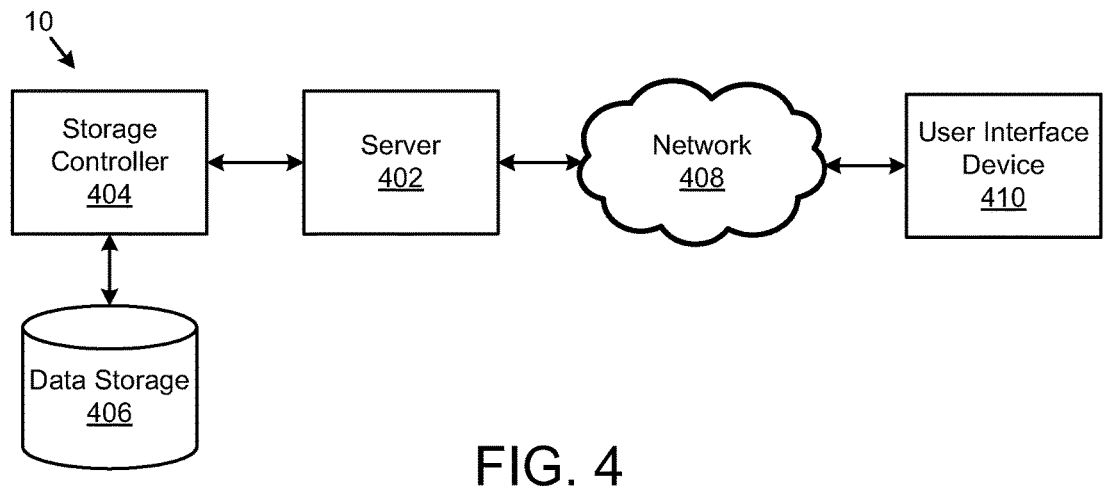
FIGS. 4 and 5 are schematic diagrams depicting two embodiments of systems for managing a cloud computing environment for use by a software application.

FIG. 4 illustrates one embodiment of system 10 for managing a cloud computing environment for use by a software application. The system 10 may include server 402, data storage device 404, network 408, and user interface device 410. In a further embodiment, system 10 may include storage controller 406 or storage server configured to manage data communications between data storage device 404 and server 402 or other components in communication with the network 408. In an alternative embodiment, storage controller 406 may be coupled to network 408. In a general embodiment, system 10 may configured to be operative (e.g., in conjunction with the processor-executable program code) to manage a cloud computing environment for use by a software application.

In one embodiment, user interface device 410 is referred to broadly and is intended to encompass a suitable processor-based device such as a desktop computer, a laptop computer, a Personal Digital Assistant (PDA), a mobile communication device or organizer device having access to network 408. System 10 may be configured such that user interface software (e.g., graphical user interface software) may be used in conjunction with user device 410.

Network 408 may facilitate communications of data between server 402 and user interface device 410. Network 408 may also facilitate communications of data between server 402 and the cloud computing environment. Network 408 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another.

Figure 5:
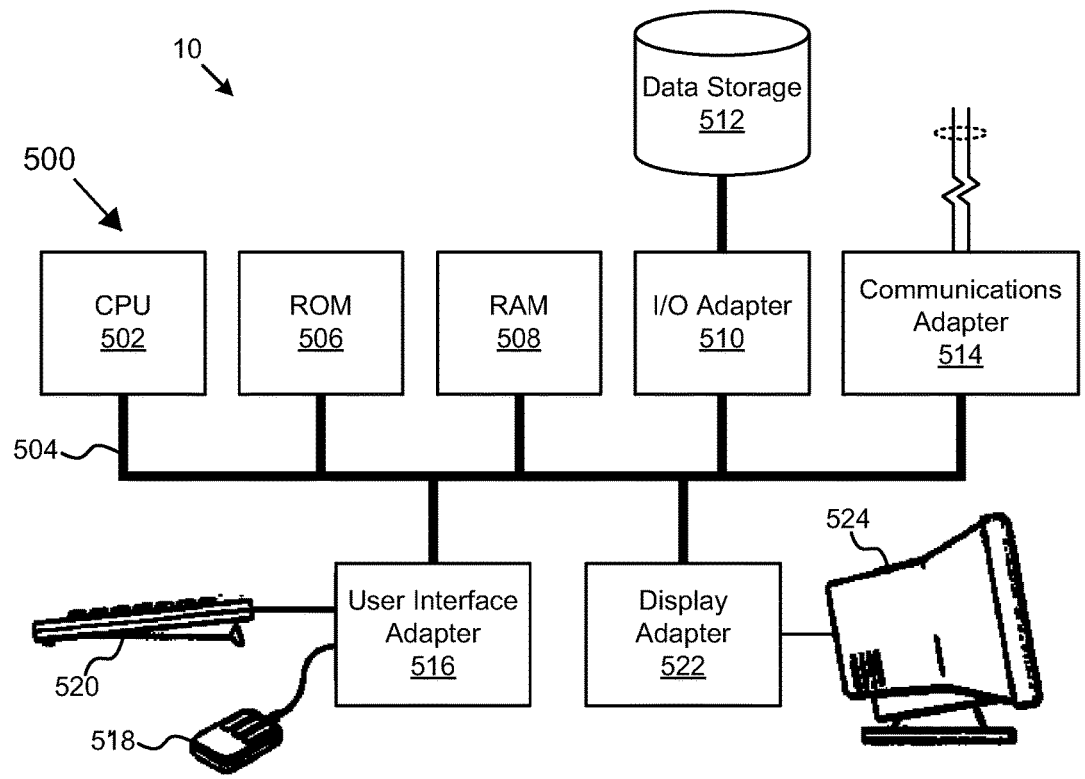

FIG. 5 illustrates another embodiment of system 10 for managing a cloud computing environment for use by a software application. Central processing unit (CPU) 502 is coupled to system bus 504. CPU 502 may be a general purpose CPU or microprocessor. The present embodiments are not restricted by the architecture of CPU 502, so long as CPU 502 supports the operations as described herein. CPU 502 may execute the various logical instructions according to the present embodiments. For example, CPU 502 may execute machine-level instructions according to the exemplary operations described below with reference to FIG. 7.

System 10 also may include Random Access Memory (RAM) 508, which may be SRAM, DRAM, SDRAM, or the like. Computer system 500 may utilize RAM 508 to store the various data structures used by a software application configured to manage a cloud computing environment for use by a software application. System 10 may also include Read Only Memory (ROM) 506 which may be PROM, EPROM, EEPROM, or the like. The ROM may store configuration information for booting the computer system 500. The RAM 508 and the ROM 506 may hold user and system 10 data.

System 10 may also include input/output (I/O) adapter 510, communications adapter 514, user interface adapter 516, and display adapter 522. I/O adapter 510 and/or user interface adapter 516 may, in certain embodiments, enable a user to interact with the computer system 500 in order to input information for authenticating a user, identifying an individual, or receiving health profile information. In a further embodiment, the display adapter 522 may display a graphical user interface associated with a software or web-based application for managing a cloud computing environment.

The I/O adapter 510 may connect to one or more storage devices 512, such as one or more of a hard drive, a Compact Disk (CD) drive, a floppy disk drive, and a tape drive. Communications adapter 514 may be adapted to couple computer system 500 to a network, which may be, for example, one or more of a LAN, a WAN, and the Internet. The user interface adapter 516 may couple user input devices, such as keyboard 520 and pointing device 518. The display adapter 522 may be driven by CPU 502 to control display on display device 524.

The present embodiments are not limited to the architecture of FIG. 4 or 5. For example, any suitable processor-based device may be utilized including without limitation, including personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Some embodiments of the present disclosure include a computer readable medium having computer usable program code executable to perform operations for managing a cloud computing environment for use by a software application. Computer readable media includes any physical medium that can store or transfer information. Such embodiments may be characterized as tangible computer readable media having (or encoded with) computer usable (e.g., machine readable) instructions for performing certain step (s), including but not limited to hard drive media, optical media, RAM, SRAM, DRAM, SDRAM, ROM, EPROM, EEPROM, tape media, cartridge media, flash memory, memory stick, and/or the like.

Figure 6:
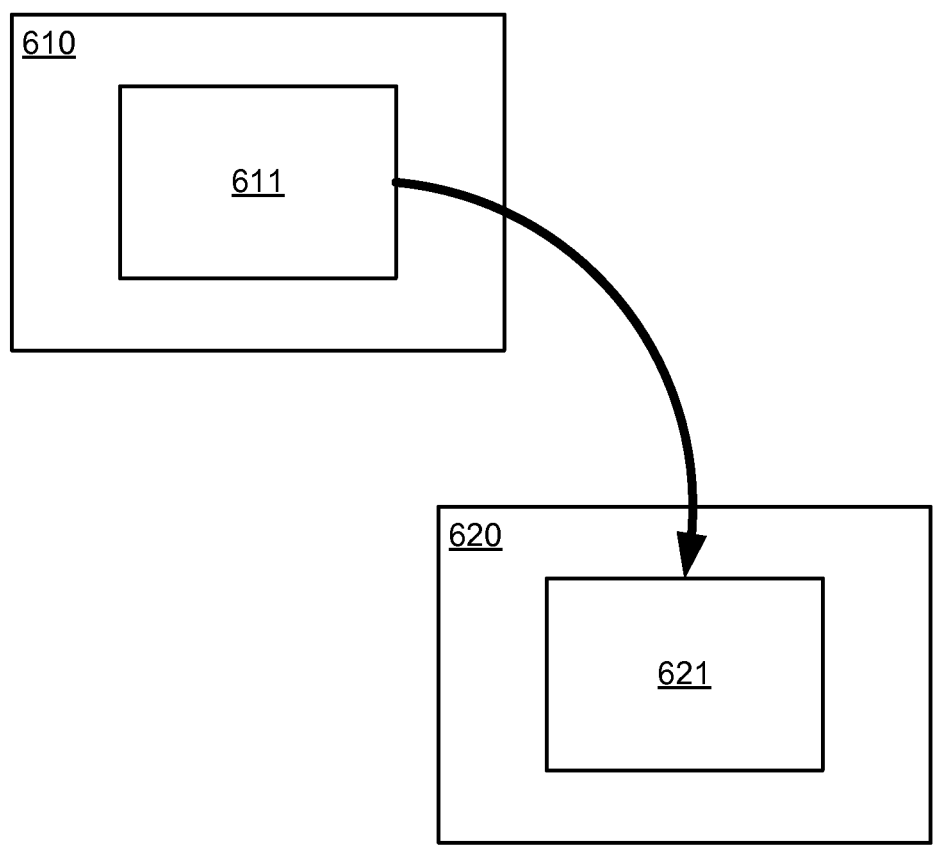
FIG. 6 is a schematic block diagram depicting an embodiment of the present computer readable media.

Some embodiments may include a first computer readable medium having a first computer usable program code executable to install second computer usable program code on a second computer readable medium, where the second computer usable program code is executable to perform operations for managing a cloud computing environment for use by a software application. Referring to FIG. 6, computer readable medium 610 contains installer software 611. Execution of installer software 611 may cause installation of cloud management software 621 on computer readable medium 620. Cloud management software 621 may be executable to perform operations for managing a cloud computing environment for use by a software application.

Figure 7:
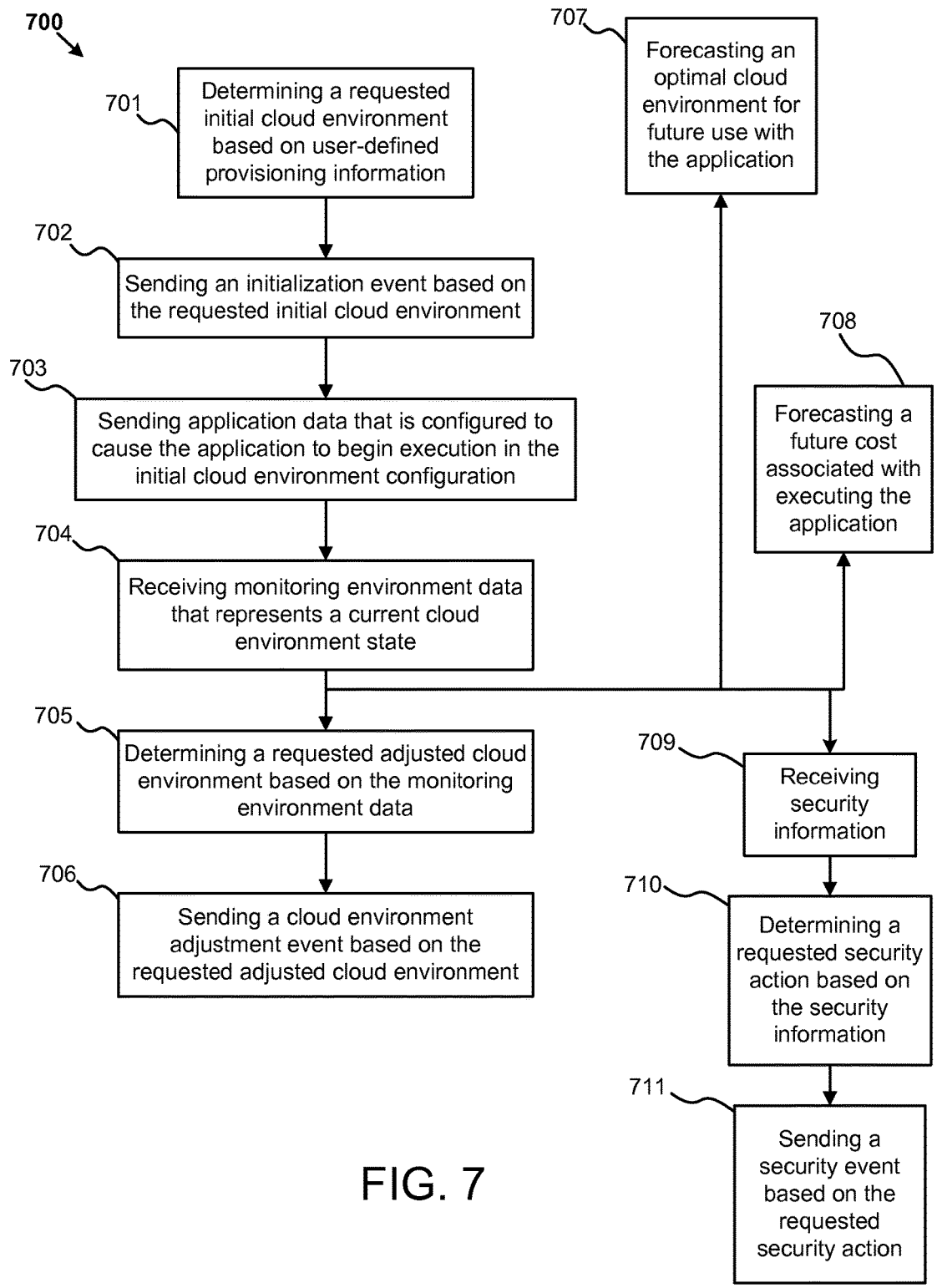
FIG. 7 is an operational flow diagram of one embodiment of a method for managing a cloud computing environment for use by a software application.

An embodiment of a method for managing a cloud computing environment for use by a software application is depicted in the operational flow diagram of FIG. 7. Method 700 may comprise determining a requested initial cloud environment based on user-defined provisioning information, where the requested initial cloud environment is an N-tier computing environment (block 701); sending an initialization event based on the requested initial cloud environment, where the initialization event is configured to cause an initial cloud environment configuration to be made available to an application (block 702); sending application data that is configured to cause the application to begin execution in the initial cloud environment configuration (block 703); receiving monitoring environment data that represents a current cloud environment state (block 704); determining a requested adjusted cloud environment based on the monitoring environment data, where the requested adjusted cloud environment is an N-tier computing environment (block 705); sending a cloud environment adjustment event based on the requested adjusted cloud environment, where the cloud environment adjustment event is configured to cause an adjusted cloud environment configuration to be made available to the application (block 706); forecasting an optimal cloud environment for future use with the application, where the forecasting the optimal cloud environment is based on the monitoring environment data (block 707); forecasting a future cost associated with executing the application, where the forecasting the future cost is based on the monitoring environment data (block 708); receiving security information (block 709); determining a requested security action based on the security information (block 710); and sending a security event (e.g., shut down of servers, generation of alerts or notifications) based on the requested security action (block 711).

The operational flow diagram of FIG. 7 is intended only as an example, and one of ordinary skill in the art will recognize that in alternative embodiments the order of operation for the various blocks may be varied, certain blocks may be performed in parallel, certain blocks of operation may be omitted completely, and additional operational blocks may be added. Thus, the present embodiments are not intended to be limited only to the operational flow diagram of FIG. 7, but rather such operational flow diagram is intended solely as an example that renders the disclosure enabling for many other operational flow diagrams for implementing the user interface. For example, in some embodiments, any or all of blocks 707-711 may be omitted.

EXAMPLE

The following example is included to demonstrate a particular embodiment of the present disclosure. It should be appreciated by those of skill in the art that the techniques disclosed in this example represent techniques designed to function well in the practice of the present disclosure. However, those of skill in the art should, in light of the present disclosure, appreciate that many changes can be made in the specific embodiments which are disclosed and still obtain a like or similar result without departing from the scope of the disclosed embodiments. For example, it will be appreciated that some of the described modules may be added or omitted. It will also be appreciated that some of the described functionality of the exemplary modules may be performed by other modules, or may be omitted. One of skill in the art with the benefit of the present disclosure will appreciate that embodiments of the present disclosure may contain many different design choices addressing, for example, the choice and arrangement of functionality performed by the modules.

The modules described herein may be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Modules may also be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Figure 8:
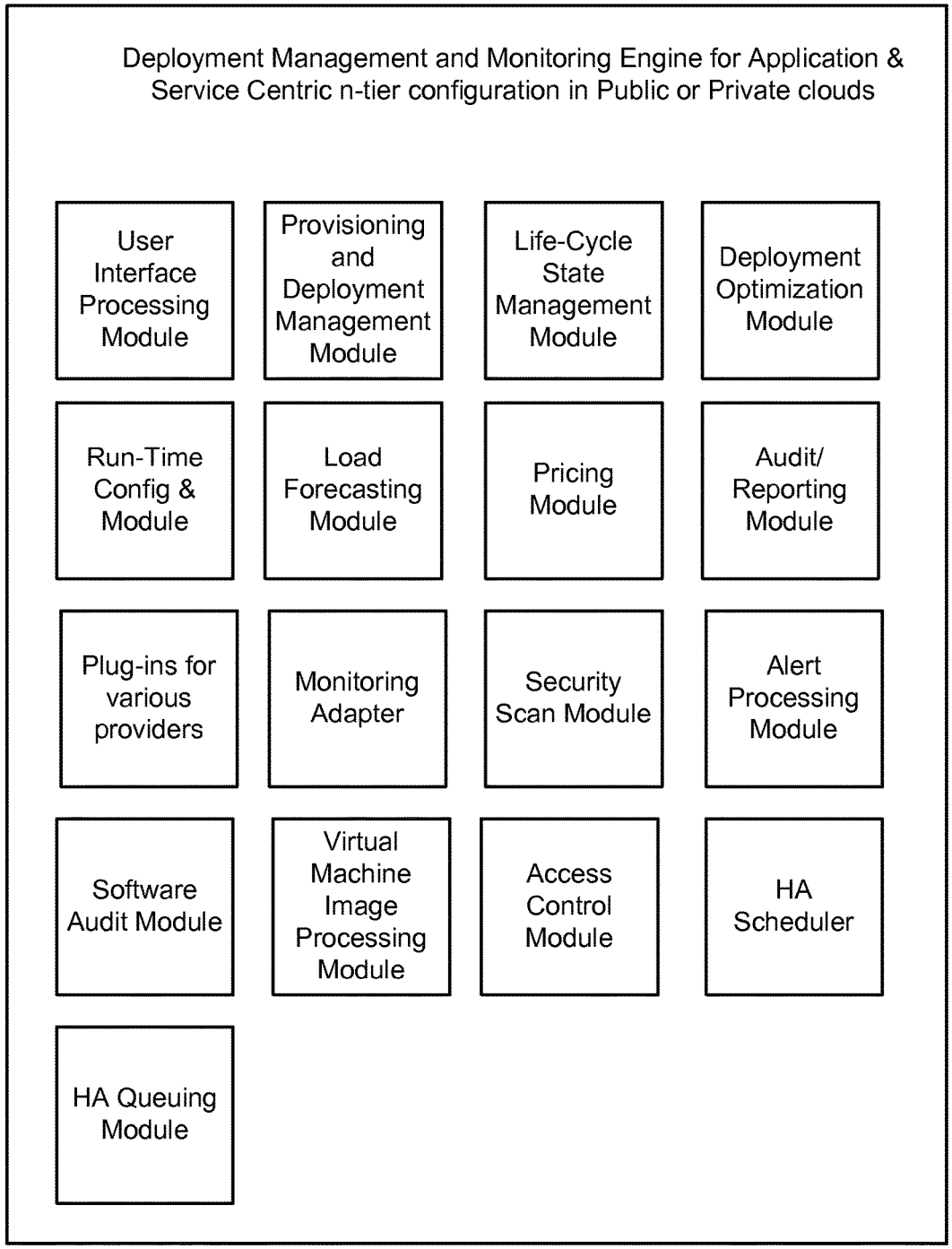
FIG. 8 depicts various modules used in one embodiment of an N-tier configuration lifecycle management engine for managing a cloud computing environment for use by a software application.

Referring to FIG. 8, various modules of an embodiment of an N-tier configuration lifecycle management engine for managing a cloud computing environment for use by a software application is described. Each of these modules may be deployed on a single server, or can be deployed on multiple servers (e.g., the Monitoring module may have two or more components running on various servers).

User Interface Processing Module

The User Interface Processing Module can capture user input and needs (e.g., how many servers, what type of servers, geographic restrictions, and minimum/max server limits for each tier, server size) and enter the data in an application database for use by various engine modules. The User Interface Processing Module allows the user to specify deployment related requirements at a high level (e.g., type of application, need for geographic redundancy, need to encrypt data, need for high availability), and creates a deployment configuration accordingly that can later be further customized and edited.

Provisioning and Deployment Management Module

The Provisioning and Deployment Management Module is responsible for provisioning the servers and ensuring the deployment rules are followed (e.g., quantity of servers to launch in each tier, firewall configuration used, etc.). The module can leverage a plug-in module for provisioning servers in various clouds (public or private). In addition the module can get input from a Deployment Optimization Module directed to the optimal provisioning of the servers.

Life Cycle State Management Module

The Life Cycle State Management Module manages the state of the application that executes in the cloud environment. This module can be a state machine that gets data for each application (e.g., each application or service) from the Monitoring Module.

The module can maintain the states of the application for each tier and overall state (e.g., deployment state, pending state, normal running state, warning state, update servers, optimization state, error state, scale up state, scale down state, shut down state). For example, if the monitoring module determines that the average utilization of servers' CPU, memory, and/or I/O utilization is over 90% in the database tier, it may generate a scale up event. The Life Cycle State Management Module may pick up the event and proceed to issue an event to add additional servers in the database tier. The Provisioning and Deployment Management Module may pick up the event and instantiate a new instance of a server in the database tier. After the new server is instantiated, the Provisioning and Deployment Management Module may issue a completion event and the Runtime Configuration Management Module can process the event and generate a event for performing post server instantiation operations, e.g. configuration file changes, service starts etc. The Runtime Configuration Management Module can receive the event, perform the task and place the task completion event for the Life Cycle State Management Module queue so that the state of the application can be updated.

The Life Cycle State Management Module should also be able to handle virtual server instance level failures similar to scale up/scale down events. The module may be able to deal with instance level failure.

Deployment Optimization Module

The Deployment Optimization Module is responsible for collecting and maintaining, for example, SLA data, pricing data, and quality of service data from different cloud providers. Prior to provisioning the resources, the Provisioning and Deployment Management module may call the Deployment Optimization Module. The deployment optimization module can use the application/service configuration information, user inputs (e.g. geographic dependencies, provider preference, SLA requirements and the actual collected data from various cloud providers) to recommend the optimal cloud configuration.

Runtime Configuration Management Module

This Runtime Configuration Management Module can perform the tasks of updating configuration files on running servers, starting or stopping applications on the virtual servers, and installing software upgrades and patches on the virtual servers. This module can have several libraries of best practice configuration templates for various types of software packages. Depending on the event, the module can dynamically create configuration files from templates and apply appropriate changes to the server(s). Upon completion of the tasks, the module may puts a message on the queue for the Life Cycle State Management Module.

Load Forecasting Module

The Load Forecasting Module can use the monitoring data from the Monitoring Module and the collected cloud provider data to forecast the load (e.g. number of servers or amount of resources that would be needed in the future to optimally run the application without degrading the quality of service). The Load Forecasting Module may operate in conjunction with the Deployment Optimization Module. The Load Forecasting Module may generate messages which will be processed by the Life Cycle State Management Module and the Pricing Module.

Pricing Module

The Pricing Module may process messages from the Monitoring Module and the Life Cycle State Management Module and, in combination with the output of the Load Forecasting Module, compute current pricing and forecast future pricing. Memory, CPU, Disk Usage, Bandwidth, along with SLAs, and backend provider cost information may be used as a part of the input for computing current pricing and forecasting future pricing. Credits received from cloud providers (e.g., for failure to meet SLA levels) may also be accounted for. The pricing module may have the ability to forecast the pricing of the cloud computing infrastructure used by any specific application/service or group of applications/services on a daily, weekly, quarterly, and/or yearly basis, thereby facilitating accurate budget forecasting by the users of the application. The prediction interval of the pricing can be customized for each account.

Audit/Reporting Module

The Audit/Reporting Module may track relevant events in the system and facilitate displaying, generating, and emailing various reports and audit logs to the proper party based on user role. The module may also the HA Scheduler to automate the process of creating and sending reports to users at a scheduled time.

Plug-Ins for Multiple Providers

These are set of libraries for APIs for connecting to various cloud providers. These libraries may also have APIs for connecting directly to virtualization providers. The purpose of the module is to provide a collection of plug-in APIs such that the details of obtaining resources for running application and services are abstracted from the provisioning module. The Provisioning and Deployment Management Module may leverage the plug-ins for provisioning servers in various environments.

Monitoring Module

The Monitoring Module may contain components for processing the monitoring data and generating appropriate events, and for collecting data from various virtual servers. The data collection component of the monitoring module may be pluggable such that any external monitoring system can be integrated with the application to collect data. The Monitoring Module may leverage both agent and agent-less monitoring.

Security Module

The Security Module may receive various security related information (e.g., firewall access reports for the virtual servers, breaches). The Security Module may provide a central processing unit for receiving security related information for various software component and services. For example, an external firewall scanner/monitor can send messages to the Security Module and in response the Security Module may process the information and generate appropriate events (e.g., shutdown server, security breach event for sending alerts/notification).

Alert/Notification Processing Module

The Alert/Notification Processing Module may process various events from various modules and be responsible for delivering user notification via different means (e.g., email, SMS, etc.).

Software Audit Module

The Software Audit Module may provide information about the version of software deployed on various servers. The module may have two components: one to audit the virtual machines that are currently running, and the other to audit the virtual machine images. The audit reports may be organized in application/service context to inform the user of the version of various software components deployed on the servers that are executing the specified application/s or service/s.

14-Virtual Machine Image Processing Module

This module may be provided to leverage the OVF standards to simplify movement and deployment of Virtual appliances and servers to different backend environments.

Access Control Module

The Access Control Module may be responsible for maintaining all the access control rules (e.g. access to root access to a virtual server; access to start/stop servers and applications/services; access to view specific data). Various modules may leverage the Access Control Module for checking user permissions for specific tasks.

HA Scheduler

The Highly Available Scheduler may provide a resilient scheduling mechanism. The HA Scheduler solution may be provided by, for example, a J2EE container.

HA Queuing

The Highly Available Queuing solution for receiving and delivering messages may be provided by, for example, a J2EE cluster.

Some (up to all) of the steps described in the sections above may be implemented using a computer having a processor (e.g., one or more integrated circuits) programmed with firmware and/or running software. Some (up to all) of the steps described in the sections above may be implemented using a distributed computing environment, which is one example of a computer system. Some (up to all) of the steps described in the sections above may be implemented using a virtual computer system (a virtual machine), where the virtual computer environment does not have a one-to-one correspondence with a physical computer environment.

Descriptions of well known assembly techniques, components, and equipment have been omitted so as not to unnecessarily obscure the present methods, apparatuses, an systems in unnecessary detail. The descriptions of the present methods and apparatuses are exemplary and non-limiting. Certain substitutions, modifications, additions and/or rearrangements falling within the scope of the claims, but not explicitly listed in this disclosure, may become apparent to those of ordinary skill in the art based on this disclosure.

The appended claims are not to be interpreted as including means-plus-function limitations, unless such a limitation is explicitly recited in a given claim using the phrase(s) "means for" and/or "step for," respectively.

APPENDIX
Example Configuration File

```
<?xml version="1.0" encoding="utf-8" ?>
<system>
  <name>cloudondemand</name>
  <version>2</version>
  <modelManagement>
    <geopreference>
      <geoid>Europe<geoid>
      <preferencerank>1<preferencerank>
    <geopreference/>
    <servicelevelreq>
      <slaid>99.999<slaid>
      <preferencerank>2<preferencerank>
    <servicelevelreg/>
    <pricingpreference>
      <preferencerank>3<preferencerank>
    <pricingpreference/>
    <tier>
      <id>T-001</id>
      <name>web</name>
      <securityGroup>apache-web-group</securityGroup>
      <keypair>cloudondemand-keypair</keypair>
      <tierindex>1</tierindex>
      <serverTypes>
        <serverType>
          <id>ST-001</id>
          <name>apache loadbalancer</name>
          <machineIdentifier>ami-5fl4f136</machineIdentifier>
          <parameters>
          </parameters>
          <startupCount>1</startupCount>
          <services>
            <service>
              <id>S-001</id>
              <name>apache-loadbalancer-with
                ssl</name>
            </service>
          </services>
        </serverType>
      </serverTypes>
    </tier>
    <tier>
      <id>T-002</id>
      <name>app</name>
      <securityGroup>jboss-app-group</securityGroup>
      <keypair>cloudondemand-keypair</keypair>
      <tierindex>1</tierindex>
      <serverTypes>
```

APPENDIX-continued
Example Configuration File

```
        <serverType>
          <id>ST-002</id>
          <name>jboss cluster node</name>
          <machineIdentifier>ami-5fl4f136</machineIdentifier>
          <parameters>
          </parameters>
          <startup Count>1</startupCount>
          <services>
            <service>
              <id>S-002</id>
              <name>JBossAS
              </name>
              <parameters>
              </parameters>
            </service>
          </services>
        </serverType>
      </serverTypes>
    </tier>
    <tier>
      <id>T-003</id>
      <name>db</name>
      <securityGroup>mysql-db-group</securityGroup>
      <keypair>cloudondemand-keypair</keypair>
      <tierindex>3</tierindex>
      <serverTypes>
        <serverType>
          <id>ST-003</id>
          <name>mysql ndbd manager</name>
          <machineIdentifier>ami-5fl4f136</machineIdentifier>
          <parameters>
          </parameters>
          <startupCount>1</startupCount>
          <services>
            <service>
              <id>S-003</id>
              <name>mysql-ndbd-
                manager</name>
            </service>
          </services>
        </serverType>
        <serverType>
          <id>ST-004</id>
          <name>mysql ndbd node</name>
          <machineIdentifier>ami-5fl4f136</machineIdentifier>
          <parameters>
          </parameters>
          <startupCount>1</startupCount>
          <services>
            <service>
              <id>S-004</id>
              <name>mysql-ndbd</name>
            </service>
          </services>
        </serverType>
        <serverType>
          <id>ST-005</id>
          <name>mysql data node</name>
          <machineIdentifier>ami-5fl4f136</machineIdentifier>
          <parameters>
          </parameters>
          <startupCount>1</startupCount>
          <services>
            <service>
              <id>S-005</id>
              <name>mysql-node</name>
            </service>
          </services>
        </serverType>
      </serverTypes>
    </tier>
  </modelManagement>
</system>
```

What is claimed is:

1. A method for operating a cloud computing environment, the method comprising:
sending, by a computer system to one or more computing resources of the cloud computing environment and based on user-defined provisioning information including security requirements that defines, at least in part, a logical organization of tiers within the cloud computing environment, a cloud environment initialization event, the cloud environment initialization event causing a cloud environment configuration having the logical organization of tiers to be made available for execution of a software application;
sending, by the computer system, the software application for execution in the organized tiers of the cloud environment configuration of the cloud computing environment;
monitoring data received from the cloud computing environment during execution of the software application; and
based on monitored data from the cloud computing environment, sending, by the computer system, a cloud environment adjustment event to the cloud computing environment to cause adjustment of the cloud environment configuration by changing at least one of the computing resources assigned to the cloud environment configuration, said cloud environment adjustment event including one or more software objects that contain information related to provisioning computing resources of the cloud computing environment for the cloud environment configuration.

2. The method of claim 1, wherein sending the cloud environment initialization event comprises passing one or more software objects that contain information related to provisioning of the one or more computing resources for the cloud environment configuration.

3. The method of claim 2, wherein the provisioning information is included in a configuration input file.

4. The method of claim 3, further comprising storing the configuration input file for later reuse.

5. The method of claim 3, wherein prior to sending the cloud environment initialization event, the configuration input file is created based on the user-defined provisioning information.

6. The method of claim 1, wherein the cloud environment adjustment event is configured based on a requested adjusted cloud environment, which in turn is determined based on monitoring data from the cloud computing environment.

7. The method of claim 1, further comprising the computer system communicating with a user device communicatively coupled to the computer system via a network, wherein the network comprises the Internet.

8. The method of claim 1, wherein the provisioning information is included in a configuration input file generated without the use of a user interface.

9. The method of claim 1, wherein the user-defined provisioning information is determined using one of: user input received via a user interface, and user input provided by another computer system.

10. The method of claim 1, wherein the cloud environment adjustment event is sent to the cloud computing environment to cause adjustment of the cloud environment configuration according to utilization of the computing resources of the cloud computing environment.

11. A system, comprising:
a processor;
a storage device communicatively coupled to the processor; and
a set of instructions on the storage device that, when executed by the processor, cause the processor to:
send, to one or more computing resources of the cloud computing environment and based on user defined provisioning information including security requirements that defines, at least in part, a logical organization of tiers within the cloud computing environment, a cloud environment initialization event, the cloud environment initialization event causing a cloud environment configuration having the logical organization of tiers to be made available for execution of a software application;
send the software application for execution in the organized tiers of the cloud environment configuration of the cloud computing environment;
monitor data received from the cloud computing environment during execution of the software application; and
based on monitored data from the cloud computing environment, send a cloud environment adjustment event to the cloud computing environment to cause adjustment of the cloud environment configuration by changing at least one of the computing resources assigned to the cloud environment configuration, said cloud environment adjustment event including one or more software objects that contain information related to provisioning computing resources of the cloud computing environment for the cloud environment configuration.

12. The system of claim 11, wherein the set of instructions cause the processor to send the cloud environment initialization event by passing one or more software objects that contain information related to provisioning of the one or more computing resources for the cloud environment configuration.

13. The system of claim 11, wherein the provisioning information is included in a configuration input file.

14. The system of claim 13, wherein the set of instructions further comprises instructions causing the processor to store the configuration input file file in the storage device for later reuse.

15. The system of claim 11, wherein the set of instructions cause the processor to determine a requested initial cloud environment configuration based on the user-defined provisioning information prior to sending the cloud environment initialization event.

16. The system of claim 11, wherein the cloud environment adjustment event is configured by the processor based on a requested adjusted cloud environment, which in turn is determined by the processor based on monitoring data from the cloud computing environment.

17. The system of claim 11, wherein the tiers of the cloud computing environment include virtual servers.

18. The system of claim 11, wherein the provisioning information is determined by the processor using one of: user input received via a user interface, and user input provided by another computer system.

* * * * *